(12) United States Patent
Iordache et al.

(10) Patent No.: US 7,431,193 B2
(45) Date of Patent: Oct. 7, 2008

(54) VIBRATION STRESS RELIEF OF WELDMENTS

(75) Inventors: Lucian Iordache, Hamilton (CA); Ovidiu Timotin, Hamilton (CA)

(73) Assignee: Siemens Power Generation, Inc., Orlando, FL (US)

( * ) Notice: Subject to any disclaimer, the term of this patent is extended or adjusted under 35 U.S.C. 154(b) by 419 days.

(21) Appl. No.: 11/208,294

(22) Filed: Aug. 19, 2005

(65) Prior Publication Data

US 2007/0040005 A1 Feb. 22, 2007

(51) Int. Cl.
*B23K 20/10* (2006.01)
*B06B 3/02* (2006.01)
*C21D 1/04* (2006.01)

(52) U.S. Cl. .................. 228/110.1; 148/558; 73/579
(58) Field of Classification Search ............ 228/110.1; 164/511, 260
See application file for complete search history.

(56) References Cited

U.S. PATENT DOCUMENTS 4,968,359 A * 11/1990 Hebel et al. ............... 148/558
5,348,212 A * 9/1994 Galanes ..................... 228/135

OTHER PUBLICATIONS

Adams, C. Mel, Berry, John T., Klauba, Bruce B., Productive applications of mechanical vibration, May 20, 2005, American Society of Materials, appendix.*
Brochure describing "The VSR-8000 System Supplies State-of-the-Art Performance with Computerized Treatment and Automatic Treatment Data Archiving"; Airmatic® Inc.; 2 pages; Form; VSR80002P; VSR Technology Group, Philadelphia, PA.

* cited by examiner

*Primary Examiner*—Jerry Lorengo
*Assistant Examiner*—Devang Patel

(57) ABSTRACT

A method of stress relief for stainless steel combustion turbine components includes vibrating the components during welding at a subharmonic frequency. The proper frequency is selected to be below a harmonic frequency, and to produce an amplitude in the range of ¼ to ½ the amplitude produced by a harmonic frequency. The component to be repaired is vibrated during and after welding at this frequency.

7 Claims, 5 Drawing Sheets

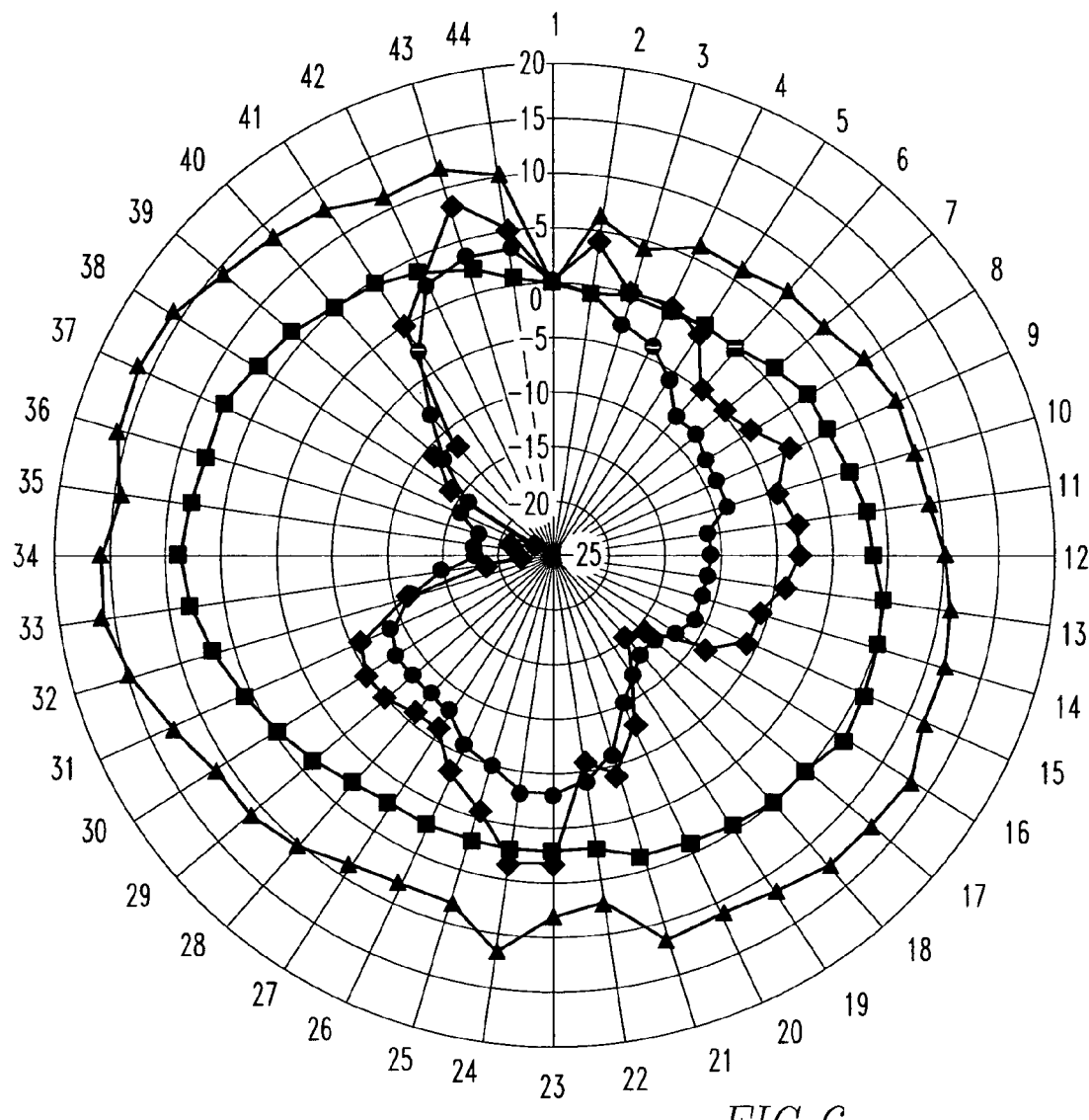
FIG. 6
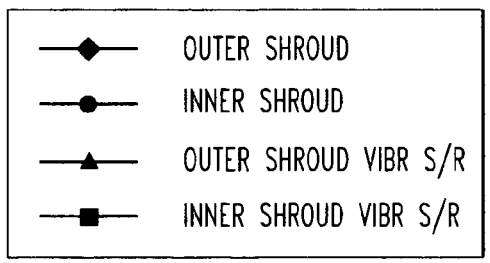
- ◆— OUTER SHROUD
- ●— INNER SHROUD
- ▲— OUTER SHROUD VIBR S/R
- ■— INNER SHROUD VIBR S/R

VIBRATION STRESS RELIEF OF WELDMENTS

BACKGROUND OF THE INVENTION

1. Field of the Invention

The present invention relates to stress reduction during welding. More specifically, the invention provides a method of stress relief wherein the component being welded is vibrated during welding to reduce stresses in the component.

2. Description of the Related Art

Welding is typically used to perform repairs on components of various equipment that is subject to harsh environments. One example is the repair of diaphragm shrouds for a combustion turbine by gas metal arc welding, micro-plasma welding, or gas tungsten arc welding. Such diaphragms are arranged in succession within the compressor of the turbine, with each successive diaphragm having an increasing number of vanes to further compress air being forced into the combustion chamber. Such diaphragms may be exposed to temperatures from room temperature to about 900° F. These diaphragms are difficult to repair, and expensive to replace. Presently available welding methods may produce significant distortion within the diaphragm, partly due to stresses created within the diaphragm from the welding process.

The use of vibrating a component being welded to reduce stress has been used for aluminum components in the past. However, vibration stress relief has not previously been used for the 410 or 403 stainless steels typically used for diaphragms, in part because appropriate vibration frequencies have not been developed. Stainless steel has a higher yield strength than other materials for which vibration stress relief has been used, increasing the difficulty of stress relief. The diaphragm and other stainless steel components of combustion turbines are very prone to distortion, making stress relief during repair of these components critical.

Accordingly, there is a need for a method of relieving stress within a component such as a combustion turbine diaphragm during weld repairs. There is a further need for the development of an appropriate frequency for using vibration stress relief upon components made from 410 stainless steel, 403 stainless steel, and other stainless steels.

SUMMARY OF THE INVENTION

The present invention provides a method of stress relief for stainless steel components such as the diaphragm shroud within a combustion turbine. The method includes the step of vibrating the component being repaired during the welding process.

Initially, the optimal frequency is determined by running a frequency test covering the spectrum of 0 to 100 Hz. The harmonic frequencies will be determined by looking for the frequencies that produce the highest amplitude vibrations. When a harmonic frequency is discovered, a frequency that is lower than the harmonic frequency, and which produces an amplitude in the range of ¼ to ½ the amplitude produced by the harmonic frequency, is selected. An initial stress relief cycle is carried out at the selected frequency. Upon completion of this cycle, welding is performed with the component being vibrated at this frequency. Upon completion of welding, the vibrating will continue throughout the cool down cycle, and should ideally be continued until the component is warm to the touch.

The use of vibration stress reduction during welding has been found to reduce the distortion of welded components during the welding process, in part due to the stress reduction.

Accordingly, it is an object of the present invention to provide a method of determining an ideal frequency for relieving stress within stainless steel combustion turbine diaphragms during welding.

These and other objects of the invention will become more apparent through the following description and drawings.

BRIEF DESCRIPTION OF THE DRAWINGS

FIG. 6 is a graph illustrating component distortion both with and without vibration stress relief.

Like reference characters denote like elements throughout the drawings.

DETAILED DESCRIPTION

The present invention provides a method of stress relief for stainless steel components, for example, the diaphragm shroud of a combustion turbine, which is commonly made from 410 stainless steel or 403 stainless steel.

Figure 1:
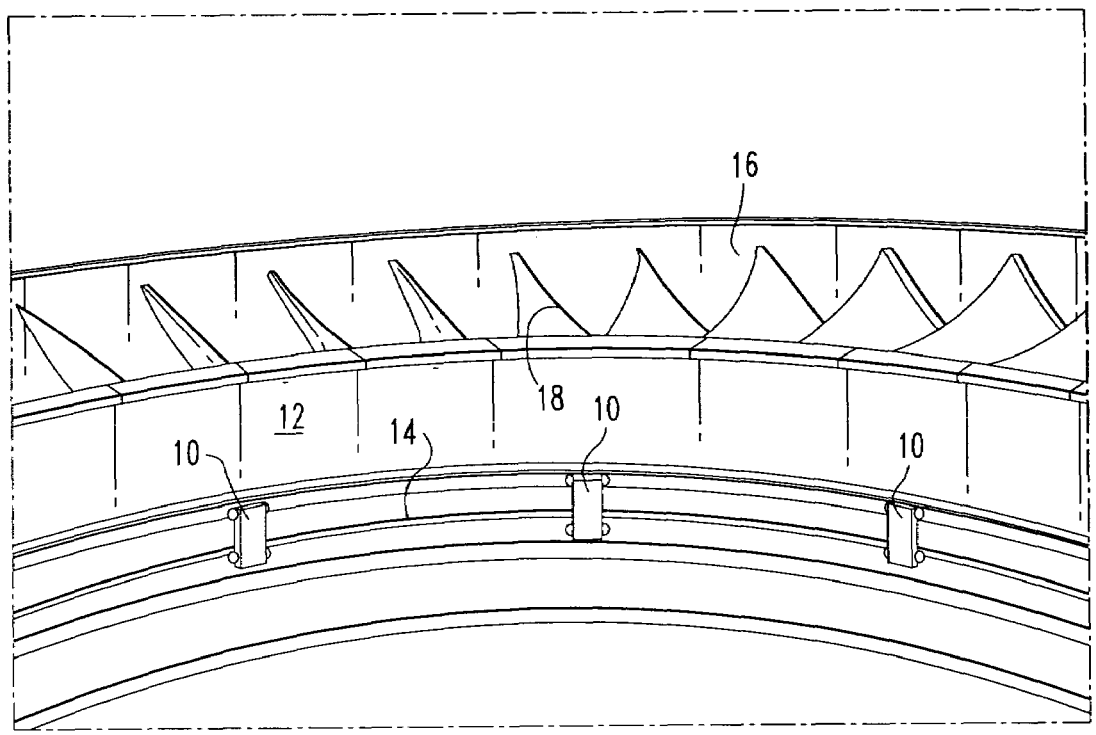
FIG. 1 is a top view of a diaphragm outer shroud, diaphragm inner shroud, and mounting plate to which the outer shroud and inner shroud have been mounted prior to performing welding according to the present invention.
Figure 2:
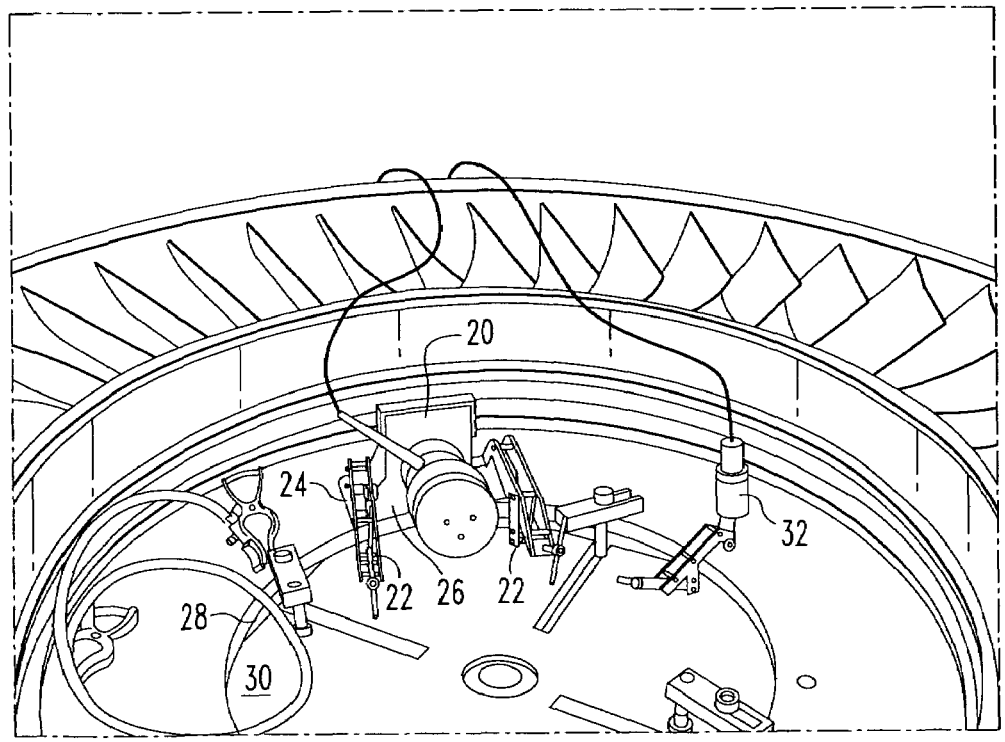
FIG. 2 is a top view of a diaphragm outer shroud, diaphragm inner shroud, mounting plate, and vibration stress relief equipment for performing weld repairs and vibration stress relief according to the present invention.
Figure 3:
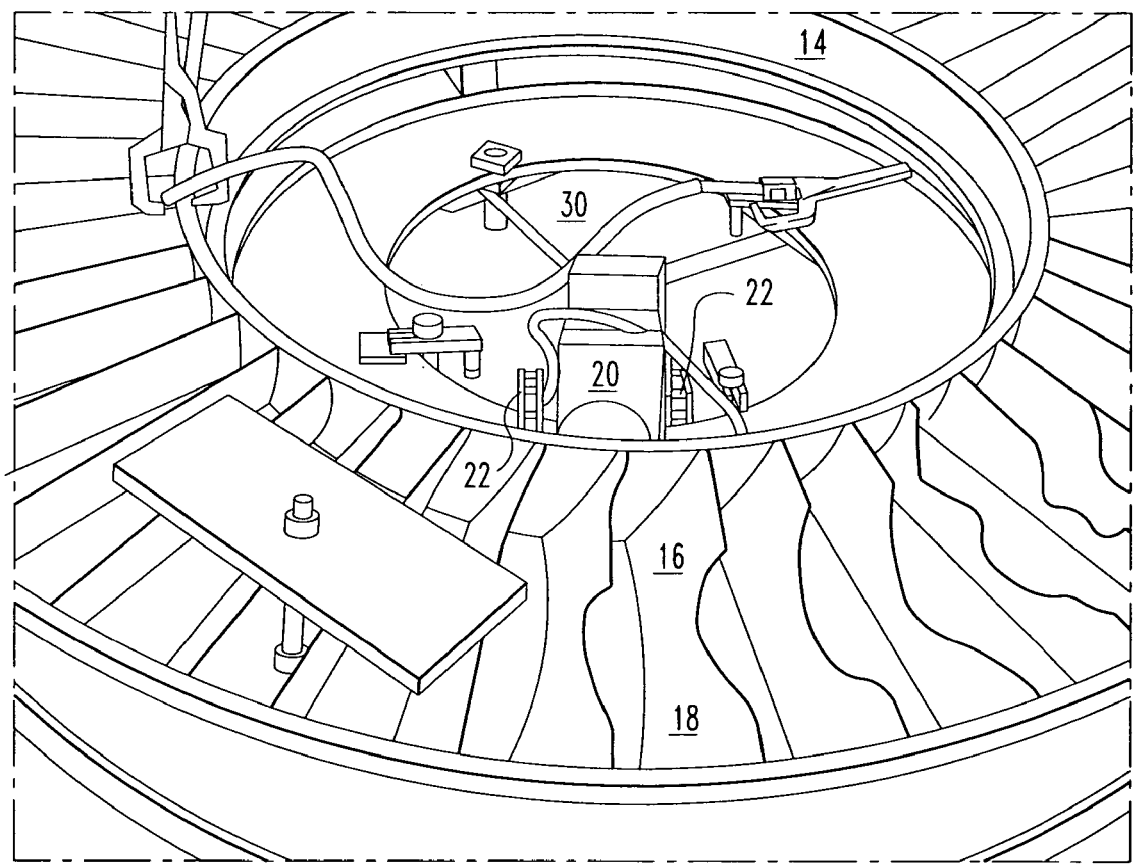
FIG. 3 is a top view of a diaphragm outer shroud, diaphragm inner shroud, mounting plate, and vibration stress relief equipment for performing weld repairs and vibration stress relief according to the present invention.

The component to be repaired is first removed, which in the case of a diaphragm for a turbine may be accomplished by procedures known to those skilled in the art of turbine repair. Referring to FIG. 1, the repair itself may begin by welding a plurality of metal straps 10 between both the inner shroud 12 and mounting plate 14, and the outer shroud 16 and the mounting plate 14. Depending on the structure of the substrate to be welded, and its ability to directly support a force inducer 20 (described below), the mounting plate 14 may or may not be necessary. Preferably, the number of metal straps 10 should not exceed 12, and should be evenly spaced around the inner shroud 12 and outer shroud 16. A preferred number of metal straps 10 may be determined by dividing the number of vanes 18 by some number that will result in no more than 12.

Figure 4:
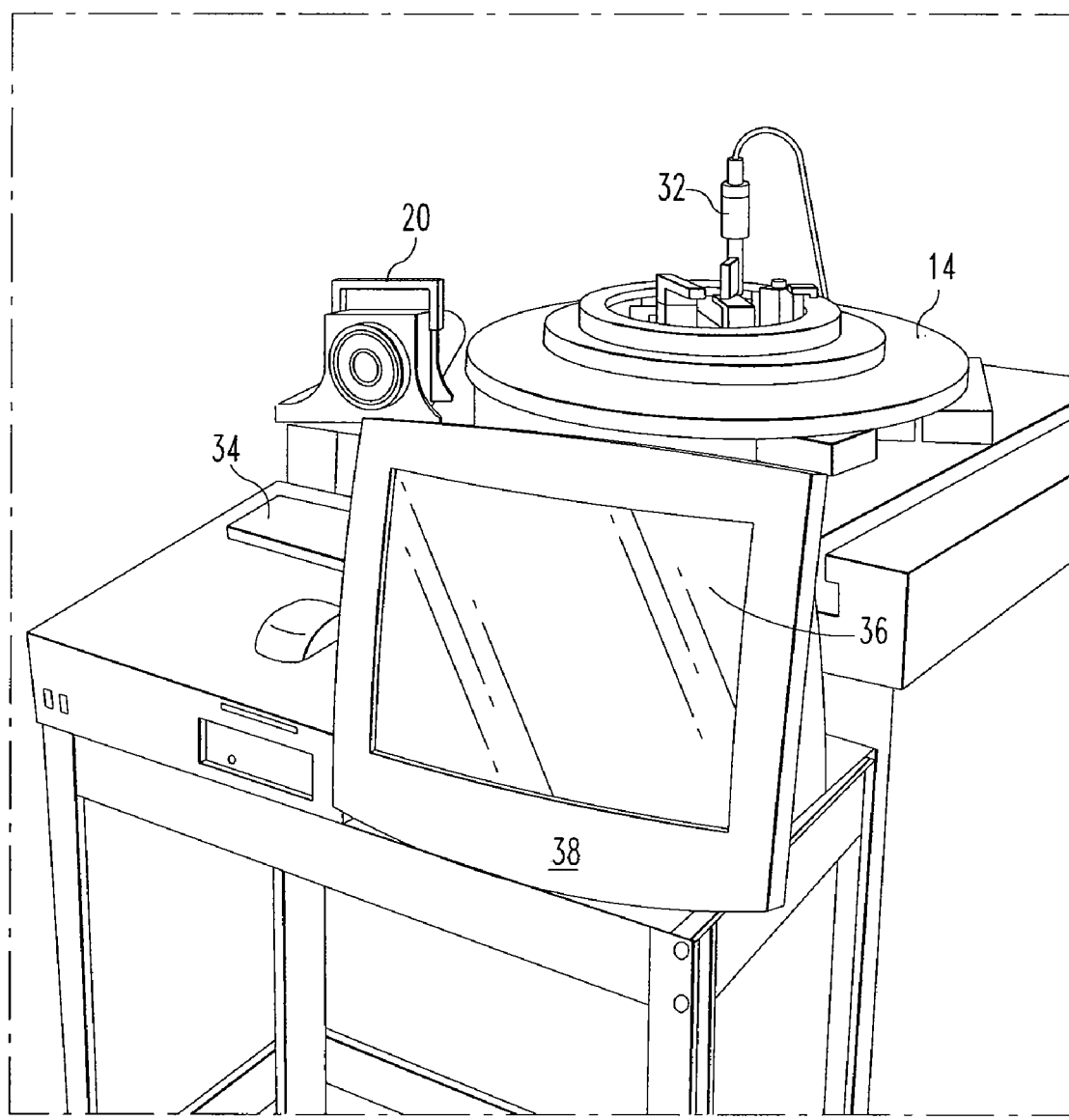
FIG. 4 is an isometric view of the apparatus for the vibration stress relief for use with the present invention.

With the components to be welded secured to the mounting plate 14, the various portions of the vibration inducing and measuring equipment may be secured to the mounting plate 14. A force inducer 20 is clamped to the mounting plate 14 by the clamps 22. Isolation shoes 24 may be used between the clamping flanges 26 of the force inducer 20 and the mounting plate 14. Rubber isolation pads 28 may be utilized to separate the mounting plate from the positioner table 30. The force inducer should be capable of vibrating the substrate with a force sufficient to result in a ratio of force to substrate weight of 20,000 lb. to 8,000 lb., or about 5:2. One example of a preferred force inducer is a Meta-Lax Model V8 force inducer. Meta-Lax equipment is available from Bonal Technologies, Inc., located in Royal Oak, Mich. A transducer 32 is also clamped to the mounting plate 14. A preferred transducer is the Meta-Lax Model 99-7 transducer. The transducer 32 is preferably clamped within 3 feet of the force inducer 20, but away from the isolation pads 28. The transducer 32 is electrically connected to the consol 34 (FIG. 4), having a screen 36 for displaying the amplitude and frequency of the vibrations. A preferred consol 34 is a Meta-Lax Model 2799 CC consol. The consol 34 is configured to output signals to a computer 38 having appropriate software to control the action of the force inducer 20 in response to input from the transducer 32, along with the weight and other information related to the inner shroud 12 and outer shroud 16. An example of such software is the 2700-CC Meta-Lax program software. The force inducer 20 is also electrically connected to the consol 34, and is thereby controlled through the computer 38 and consol 34.

Figure 5:
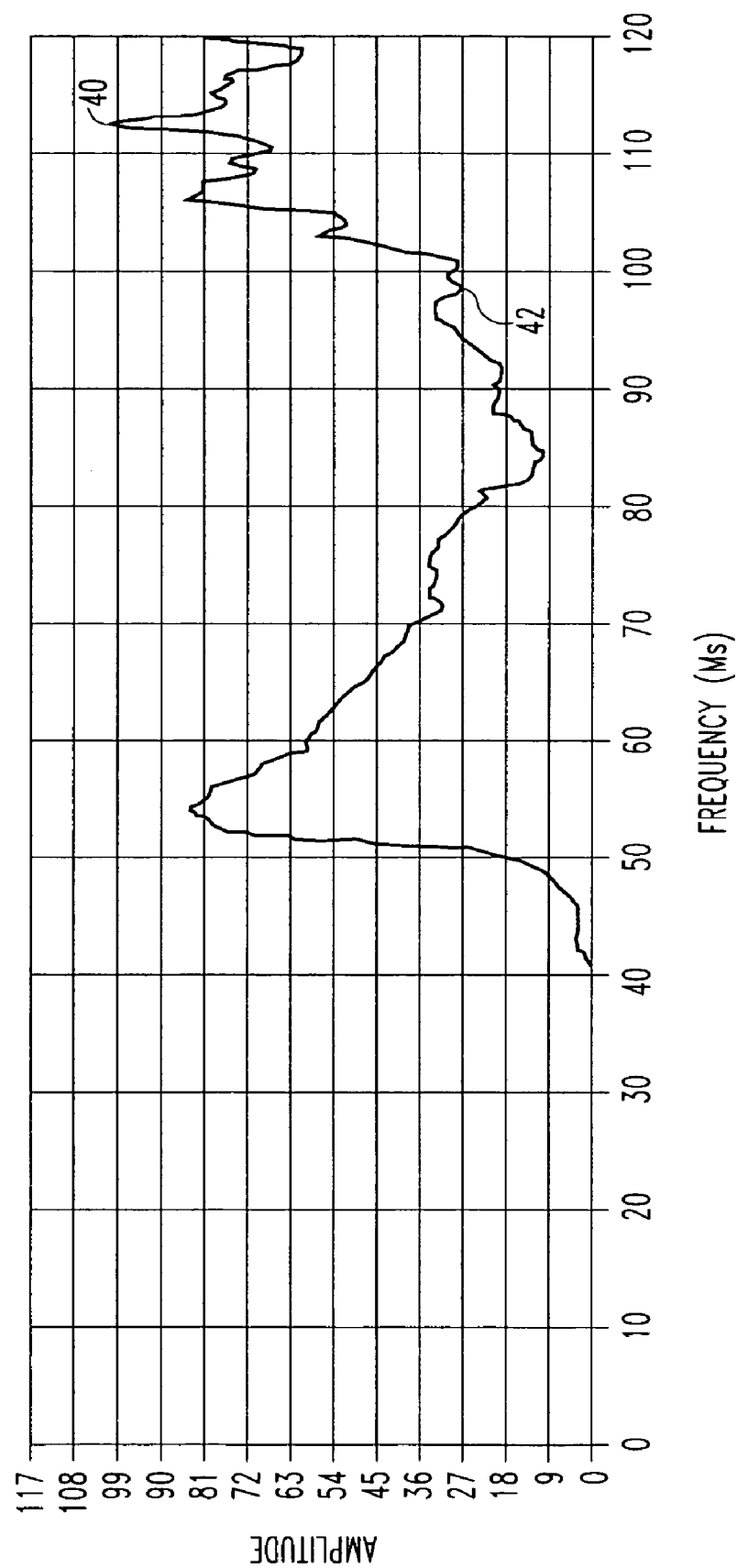
FIG. 5 is a graph showing the results of a test to determine an appropriate vibration frequency.

Next, an appropriate vibrating frequency is determined. Such a frequency is typically between 35 Hz and 95 Hz, determined using a test spectrum that is preferably from 0 to 150 Hz. As each frequency is tested, the resulting vibrational amplitude is recorded. Preferably, the test should be completed within 30 seconds, and the force inducer 20 may be run at about 30% of its full power. The harmonic frequencies can be determined by examining the amplitudes produced by the various frequencies, with the frequencies producing the greatest amplitude being the harmonic frequencies. Referring to FIG. 5, the harmonic frequency of 112 Hz is shown on the graph at 40, with the amplitude at this frequency being 100. The frequency selected for stress relief should preferably be a frequency that is lower than a harmonic frequency, and produces an amplitude that is preferably between ¼ and ½ the amplitude produced by the harmonic frequency, and more preferably ⅓ to ½ the amplitude produced by the harmonic frequency, to provide sufficient vibration for stress relief while avoiding vibration that would damage the component being repaired. In the illustrated example of FIG. 5, the selected stress relief frequency, shown at 42, is 98 Hz, producing an amplitude of 27.2.

Upon determination of the proper frequency, the force inducer 20 is used to induce vibrations within the mounting plate 14, and therefore the inner shroud 12 and outer shroud 16, at the selected frequency for the duration of the welding process. The amplitude of the vibrations induced is kept sufficiently small to resist any effect on the accuracy of the welding.

Upon completion of the welding, the force inducer 20 is again used to vibrate the mounting plate 14, inner shroud 12, and outer shroud 16 while the weld cools. Preferably, the vibration continues until the welded components have cooled to the point where they are warm to the touch. At this point, the metal strips 10 may be removed, and the inner shroud 12 and outer shroud 16 inspected for any dimensional distortion.

FIG. 6 is a graph comparing the distortion resulting from the welding process of the inner shroud 12 and outer shroud 16 both with and without vibrational stress relief. The numbers 1-44 around the circumference of the graph indicate circumferential position around each diaphragm 12, 16. The vertical numbers −20 to 20 extending from the center of the graph to the top edge of the graph indicate the degree of distortion. As can be seen from the graph, a weld repair done without vibrational stress relief results in significantly greater distortion than a weld repair done with vibrational stress relief. With fewer internal stresses within the stress relieved substrates, shrinkage resulting from the welding is minimized.

The present invention therefore provides a method of relieving stress within stainless steel substrates during welding. The method further provides a method of determining an ideal frequency for the vibrational stress relief for use while welding stainless steel combustion turbine diaphragms.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of reducing stresses within a stainless steel combustion turbine component during welding, the method comprising:

identifying a harmonic frequency of the combustion turbine component;

selecting a frequency that produces an amplitude of about ¼ to ½ an amplitude produced by the harmonic frequency, and which is a lower frequency than the harmonic frequency; and vibrating the combustion turbine component with a constant force at the selected frequency while welding the combustion turbine component, wherein the constant force has a ratio to combustion turbine component weight of about 5:2.

2. The method according to claim 1, further comprising vibrating the combustion turbine component at the selected frequency as the combustion turbine component cools after welding.

3. The method according to claim 1, wherein the frequency selected is between about 35 Hz and about 150 Hz.

4. The method according to claim 1, wherein the combustion turbine component is made from a stainless steel from the group consisting of 403 stainless steel and 410 stainless steel.

5. The method according to claim 4, further comprising vibrating the combustion turbine component at the selected frequency as the combustion turbine component cools after welding.

6. A method of reducing stresses within a stainless steel combustion turbine component during welding, the method comprising:

identifying a harmonic frequency of the combustion turbine component;

selecting a frequency that produces an amplitude of about ¼ to ½ an amplitude produced by the harmonic frequency, and which is a lower frequency than the harmonic frequency; and vibrating the combustion turbine component with a constant force at the selected frequency while welding the combustion turbine component over substantially an entire welding cycle, wherein the combustion turbine component is made from a stainless steel from the group consisting of: 403 stainless steel and 410 stainless steel, further comprising vibrating the combustion turbine component with a force having a ratio to combustion turbine component weight of about 5:2.

7. The method according to claim 6, wherein the frequency selected is between about 35 Hz and about 150 Hz.

* * * * *